US010740258B2

(12) United States Patent
Alexander et al.

(10) Patent No.: US 10,740,258 B2
(45) Date of Patent: Aug. 11, 2020

(54) TIMER-BASED I/O COMPLETION POLLING FOR LOW LATENCY STORAGE DEVICE (71) Applicant: Microsoft Technology Licensing, LLC, Redmond, WA (US)

(72) Inventors: Robin Andrew Alexander, Woodinville, WA (US); HoYuen Chau, Bellevue, WA (US); Xiaozhong Xing, Bellevue, MA (US); Danyu Zhu, Redmond, WA (US); Liang Yang, Sammamish, WA (US); Vishal Jose Mannanal, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/168,039

(22) Filed: Oct. 23, 2018

(65) Prior Publication Data
US 2020/0125504 A1 Apr. 23, 2020

(51) Int. Cl.
G06F 13/16 (2006.01)
G06F 3/06 (2006.01)

(52) U.S. Cl.
CPC .......... *G06F 13/1668* (2013.01); *G06F 3/061* (2013.01); *G06F 3/0659* (2013.01); *G06F 3/0673* (2013.01)

(58) Field of Classification Search
CPC .. G06F 13/1668; G06F 3/0673; G06F 3/0659; G06F 3/061
See application file for complete search history.

(56) References Cited

U.S. PATENT DOCUMENTS

| 5,488,713 | A | * | 1/1996 | Norton ................ G06F 11/3457 703/22 |
| 6,138,176 | A |  | 10/2000 | McDonald et al. |
| 6,195,715 | B1 |  | 2/2001 | Hoge et al. |
| 6,434,630 | B1 | * | 8/2002 | Micalizzi, Jr. ........ G06F 13/385 710/263 |
| 7,853,960 | B1 |  | 12/2010 | Agesen et al. |
| 8,588,228 | B1 |  | 11/2013 | Onufryk et al. |
| 2002/0144004 | A1 |  | 10/2002 | Gaur et al. |

(Continued)

FOREIGN PATENT DOCUMENTS

EP  3388934 A1  10/2018

OTHER PUBLICATIONS

"Non Final Office Action Issued in U.S. Appl. No. 16/168,133", dated Nov. 6, 2019, 17 Pages.

(Continued)

*Primary Examiner* — Idriss N Alrobaye
*Assistant Examiner* — Ronald T Modo
(74) *Attorney, Agent, or Firm* — Buckley, Maschoff & Talwalker LLC (57) ABSTRACT

An I/O processing system includes reception of a request to perform an I/O operation at a storage driver, and, in response to receiving the request, providing of the request to a storage device, and scheduling a timer associated with a callback routine to determine whether the storage device has completed the I/O operation, and, in response to expiration of the scheduled timer, determination of whether the storage device has completed the I/O operation.

20 Claims, 12 Drawing Sheets (56) References Cited

U.S. PATENT DOCUMENTS

| | | | |
|---|---|---|---|
| 2010/0138626 A1* | 6/2010 | Lynn | G06F 11/3034 |
| | | | 711/170 |
| 2010/0274940 A1 | 10/2010 | Ahmad et al. | |
| 2011/0179417 A1 | 7/2011 | Inakoshi | |
| 2012/0303842 A1 | 11/2012 | Cardinell et al. | |
| 2013/0024875 A1 | 1/2013 | Wang et al. | |
| 2014/0101392 A1 | 4/2014 | Stern | |
| 2017/0300228 A1* | 10/2017 | Gollapudi | G06F 3/061 |
| 2018/0095675 A1* | 4/2018 | Kachare | G06F 3/0611 |
| 2018/0120918 A1 | 5/2018 | Kwon et al. | |
| 2020/0097419 A1 | 3/2020 | Xing et al. | |

OTHER PUBLICATIONS

Nakajima, et al., "Effective I/O Processing with Exception-Less System Calls for Low-Latency Devices", In Proceedings of the Third International Symposium on Computing and Networking, Dec. 8, 2015, pp. 604-606.

"International Search Report and Written Opinion Issued in PCT Application No. PCT/US2019/039110", dated Oct. 7, 2019, 13 Pages.

Jayasekara, Deepal, "Handling IO—NodeJS Event Loop—Part 4", Retrieved from: https://blog.insiderattack.net/handling-io-nodejs-event-loop-part-4-418062f917d1, Nov. 26, 2017, 14 Pages.

"International Search Report and Written Opinion Issued in PCT Application No. PCT/US19/029028", dated Jan. 7, 2020, 11 Pages.

"Final Office Action Issued in U.S. Appl. No. 16/168,133", dated Mar. 3, 2020, 20 Pages.

Hudek, et al., "Creating a Passive-Level Interrupt", Retrieved From https://docs.microsoft.com/en-us/windows-hardware/drivers/wdf/supporting-passive-level-interrupts, Apr. 20, 2017, 8 Pages.

* cited by examiner

TIMER-BASED I/O COMPLETION POLLING FOR LOW LATENCY STORAGE DEVICE

BACKGROUND

Storage devices currently utilize interrupts to process I/O requests received from user-mode applications. For example, after completing a requested I/O operation, a storage device generates an interrupt which is transmitted to its host computer. The operating system of the host computer receives the interrupt and dispatches it to a kernel-mode interrupt handler, which identifies the corresponding I/O request and completes the request by providing an appropriate response to the requesting application.

The proportion of I/O processing time attributable to the above process may be unacceptable in systems which use modern Solid-State Drives or other low-latency storage devices, particularly under intensive I/O workloads. These issues are exacerbated in a virtualized environment, where the interrupt generated by the storage device must be delivered to a physical CPU, to a Hypervisor layer, and then to a virtual CPU. Moreover, a low latency storage device may be capable of delivering its I/O interrupts to only a limited number of CPUs. Consequently, the CPUs which receive the I/O interrupts may become saturated before the storage device reaches its maximum throughput.

Systems are desired to process incoming I/O requests without using hardware interrupts and while providing reduced latency and increased throughput. Further, systems are desired which exhibit the above attributes while conserving CPU usage as compared to other systems.

DETAILED DESCRIPTION

The following description is provided to enable any person in the art to make and use the described embodiments. Various modifications, however, will remain readily-apparent to those in the art.

Conventional I/O processing protocols present a technical problem of excessive processing overhead when used in conjunction with low-latency storage devices. Some approaches for reducing this overhead consume excessive CPU cycles. Some embodiments provide a technical solution to this technical problem by scheduling a high-resolution timer to poll for I/O completion. This approach may reduce I/O latency, conserve CPU cycles, and provide consistent I/O throughput from low-latency storage devices on a host machine or in a virtualized environment.

According to some embodiments, the high-resolution timer is based on a synthetic timer source provided by a virtualization environment and backed by a physical timer source. The high-resolution timer may provide a 5 µs-10 µs firing interval, while the minimum interval of existing synthetic timers is 100 µs.

Embodiments may implement more than one high-resolution timer (e.g., one timer per I/O queue), and all high-resolution timers may be based on one dedicated synthetic timer source provided by a virtualization environment. Usage of a dedicated timer source for low latency storage avoids complications and competition from other drivers or kernel components which might otherwise use the timer source.

Some embodiments provide dedicated timer interrupt messages for each system processor. This arrangement avoids the use of Inter-Processor Interrupts (IPIs) to communicate timer interrupts between processors. IPIs are particularly expensive in a virtualization environment since a virtual processor must exit and re-enter virtualization mode in order to process a received IPI.

Figure 1:
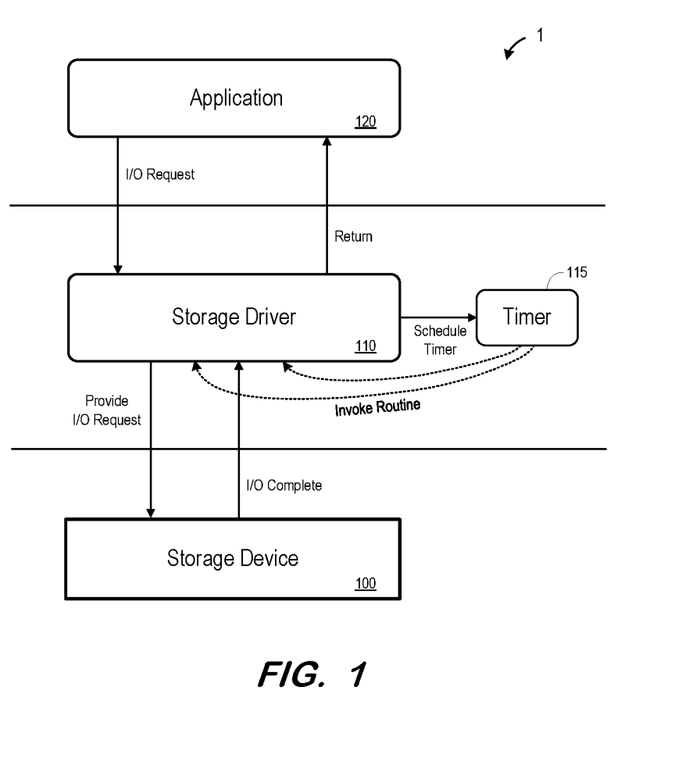
FIG. 1 illustrates a system implementing timer-based I/O completion polling according to some embodiments.

FIG. 1 illustrates system 1 according to some embodiments. Embodiments are not limited to system 1 or to any particular implementation described herein. With the exception of storage device 100, the elements of system 1 may represent a bare metal (i.e., non-virtualized) environment or a virtualized environment. As described herein, embodiments may provide a greater performance benefit when deployed within a virtualized environment as compared to a non-virtualized environment. A more detailed description of embodiments deployed in a virtualized environment will be provided with respect to FIGS. 3 and 4.

Storage device 100 is illustrated in communication with storage driver 110. Storage driver 110 comprises executable program code providing an interface between storage device 100 and other software components within or executed by the (host or virtualized) operating system. Storage driver 110 may comprise a single storage driver or multiple layers of storage drivers in an operating system.

Application 120 may comprise any software application executing on the operating system. According to some embodiments, application 120 comprises a user-mode application executed in a virtual machine or in a host operating system. Application 120 may request I/O operations and receive indications of completed I/O operations from storage driver 110.

A brief description of the operation of system 1 according to some embodiments now follows. Application 120 may transmit an I/O request to read data from or write data to storage device 100. The I/O request is received by storage driver 110 due to an association between storage driver 110 and storage device 100. In some embodiments, the I/O request is received from application 120 by an operating system component such as an I/O manager prior to being passed to storage driver 110. In this regard, the I/O request may pass through several drivers and/or components of an operating system stack prior to reaching storage driver 110. In a virtualized environment, the stack may include a virtualized operating system, a Hypervisor layer, and a host operating system.

Storage driver 110 provides the I/O request to storage device 100 via protocols known in the art and described in detail below. Storage driver 110 also sends a request to schedule timer 115 with an associated callback routine. Timer 115 fires upon expiration, invoking the callback routine to determine whether the requested I/O operation has been completed.

If the operation is complete, the request is completed to application 120. If not, or if another I/O request is outstanding to storage device 100, the timer is again scheduled as described above. FIG. 1 illustrates a scenario in which the timer fires and the routine is executed to determine that the I/O operation has not been completed, the timer is rescheduled, and the timer fires again to invoke the callback routine and determine that the I/O operation has been completed. The request is then completed to application 120, as illustrated by the arrow from storage driver 110 to application 120 labeled "Return".

Figure 2:
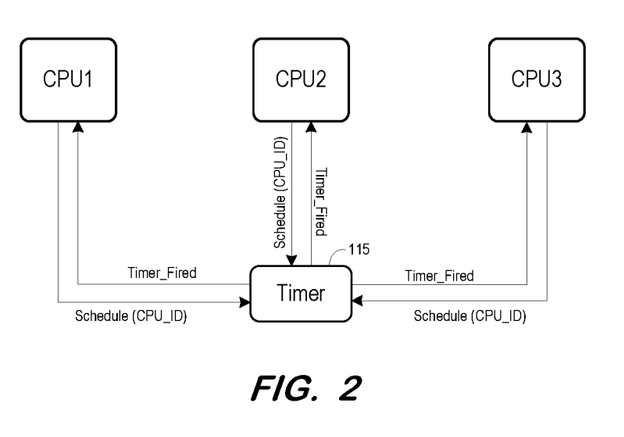
FIG. 2 illustrates the use of CPU-specific timer interrupts according to some embodiments.

FIG. 2 illustrates timer interrupt processing according to some embodiments. Each of processors CPU1, CPU2 and CPU3 is associated with an in-band (e.g., message-signaled) interrupt in which it is the target processor. For example, a scheduling request may include an ID identifying the target CPU. Accordingly, each of processors CPU1, CPU2 and CPU3 may request timer 115 to schedule a timer associated with a callback routine, and timer 115 transmits a timer interrupt directly to the requesting CPU upon expiration of the timer. In conventional arrangements, timer 115 would transmit this interrupt to a same CPU regardless of the requesting CPU, and the interrupt would be passed to the requesting CPU via IPIs as described above.

Figure 3:
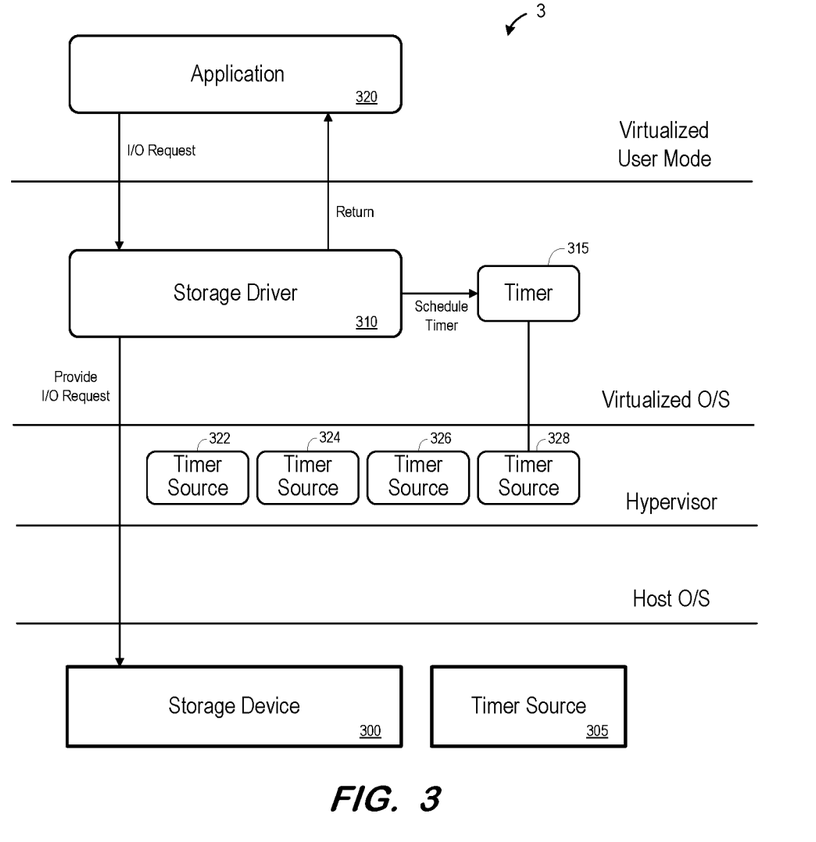
FIG. 3 illustrates a system implementing timer-based I/O completion polling in a virtualized environment according to some embodiments.

System 3 of FIG. 3 illustrates a virtualized environment according to some embodiments. Storage device 300 and timer source 305 comprise physical components of a host computing system, which may exhibit a standalone or distributed architecture. Storage device may comprise one or more storage devices as described herein.

The computing system executes a host operating system and a Hypervisor layer thereon to support one or more virtual machines which share the physical resources of the host computing system. One virtual machine is illustrated, comprising a virtualized operating system and user mode. The virtualized operating system comprises storage driver 310 and timer 315, and the virtualized user mode comprises application 320. Storage driver 310, timer 315, and application 320 may operate as described above with respect to storage driver 110, timer 115, and application 120 of system 1.

The Hypervisor layer of system 3 includes four synthetic timer sources 322-328 which are based on timer source 305. Synthetic timer sources 322-328 are exposed for use by virtual machines. Embodiments are not limited to four synthetic timer sources. Timer 315 is built based on timer source 328 as indicated in FIG. 3. According to some embodiments, timer source 328 is allocated and dedicated to I/O completion polling.

Figure 4:
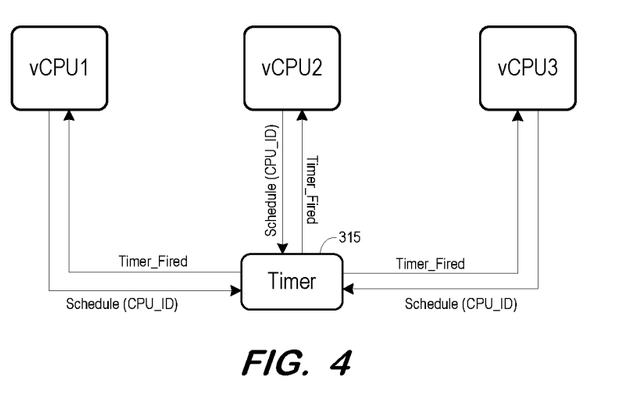
FIG. 4 illustrates the use of virtual CPU-specific timer interrupts in a virtualized environment according to some embodiments.

FIG. 4 is a representation of timer interrupt message flow in a virtualized environment according to some embodiments. In order to schedule a timer as described herein, one of virtual processors vCPU1, vCPU2 and vCPU3 sends a message to timer 315 including a self-identifying message ID. Upon expiration of the scheduled timer, timer 315 transmits a timer interrupt directly to the requesting virtual CPU using an MSI-X interrupt. This arrangement avoids the transmission of costly IPIs between virtual processors.

Figure 5:
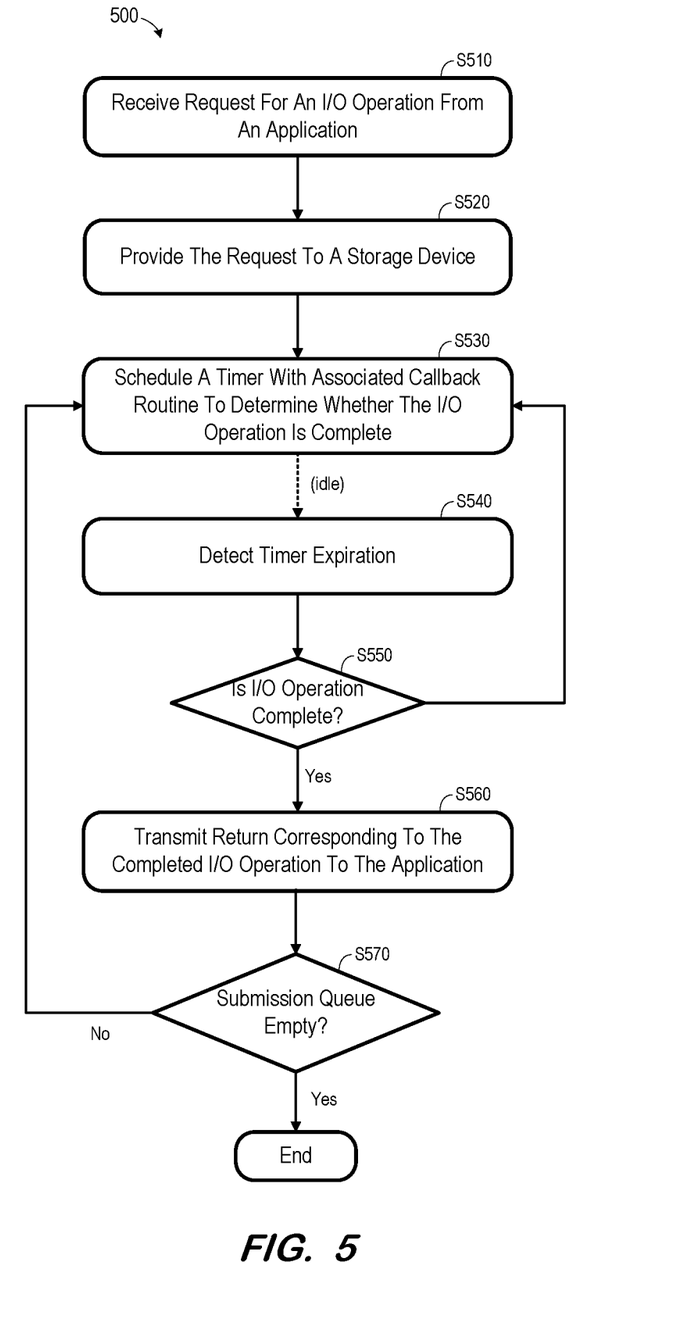
FIG. 5 is a flow diagram of a process to provide timer-based I/O completion polling according to some embodiments.

FIG. 5 comprises a flow diagram of process 500 according to some embodiments. In some embodiments, processing units (e.g., one or more processors, processing cores, processor threads) of a computing device (e.g., a computer server) execute software program code to cause the device to perform process 500. Process 500 and all other processes mentioned herein may be embodied in processor-executable program code read from one or more of non-transitory computer-readable media, such as a hard disk, a Flash drive, etc., and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 500 will be described with respect to the components of system 1. It should be understood that the similar operations may be performed by application 320, storage driver 310, timer 315 and storage device 300 in the virtualized environment of system 3.

Initially, at S510, a request for an I/O operation (i.e., an I/O request) is received from an application. Generally, the request may be transmitted from application 120, received by an operating system component, and routed to a device driver stack corresponding to the hardware device associated with the I/O request. In the present example, it will be assumed that the I/O request is associated with storage device 100 and is therefore routed to and received by storage driver 110 at S510.

Next, at S520, the I/O request is provided to the storage device. According to some embodiments, providing the I/O request to storage device 100 comprises writing the I/O request into a submission queue of storage device 100.

Figure 6:
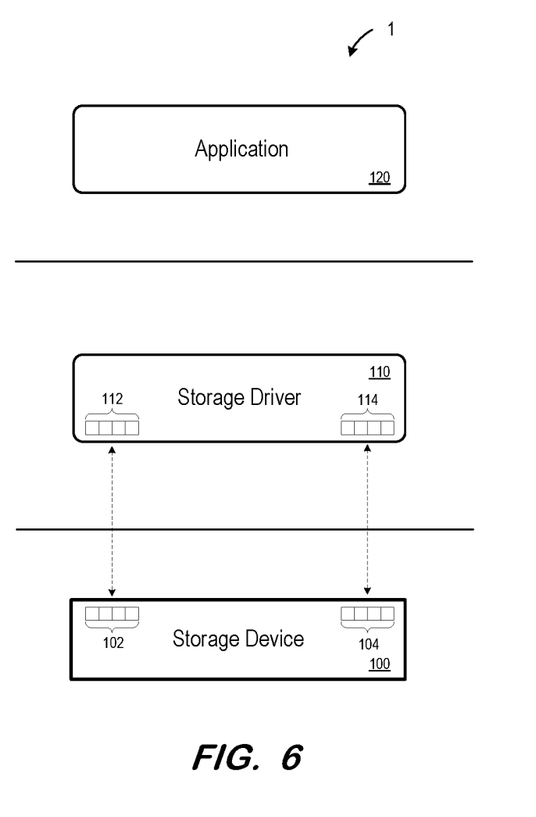
FIG. 6 illustrates driver queues and corresponding device queues according to some embodiments.

FIG. 6 illustrates submission queues according to some embodiments. During initialization of storage driver 110 (e.g. at system power-on), submission queues 112 (i.e., memory buffers) are allocated for storage driver 110. Moreover, each of queues 112 is associated with one of submission queues 102 (i.e., hardware registers) created within storage device 100. Similarly, completion queues 114 for storage driver 110 are allocated, each of which is associated with one of completion queues 104 created within storage device 100. Each of queues 102, 104, 112 and 114 includes four queues, that is, each illustrated box represents a distinct queue.

Figure 7:
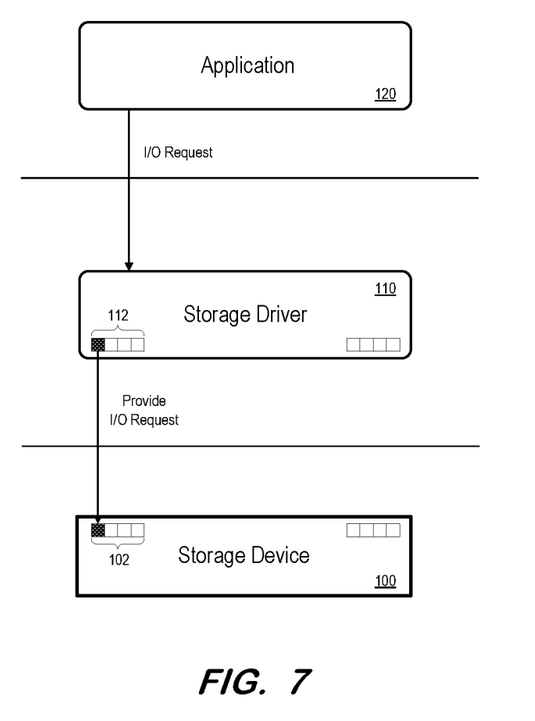
FIG. 7 illustrates reception of an I/O request and providing an I/O request to a storage device according to some embodiments.

According to some embodiments of S520, the I/O request is received at a submission queue 112 of storage driver 110 and then written into the corresponding submission queue 102 (i.e., device memory) of storage device 100. FIG. 7 illustrates S510 and S520 according to some embodiments. The writing of the request into the corresponding submission queue 102 of storage device 100, and subsequent signaling to storage device 100, triggers storage device 100 to begin execution of the requested I/O operation that the request is ready for execution.

In some embodiments, the submission queue 112 (and resulting submission queue 102) to which the I/O request is written depends upon the CPU from which the I/O request was received. For example, a CPU ID-to-submission queue table may be used to determine the submission queue 102 to which the request will be written. Upon receiving a request from a CPU, the table is checked to determine a submission queue associated with an ID of the CPU. If no table entry exists for the CPU ID, an entry is created. The association of submission queues with particular CPUs may assist in load balancing the I/O requests among all the submission queues 102.

Figure 8:
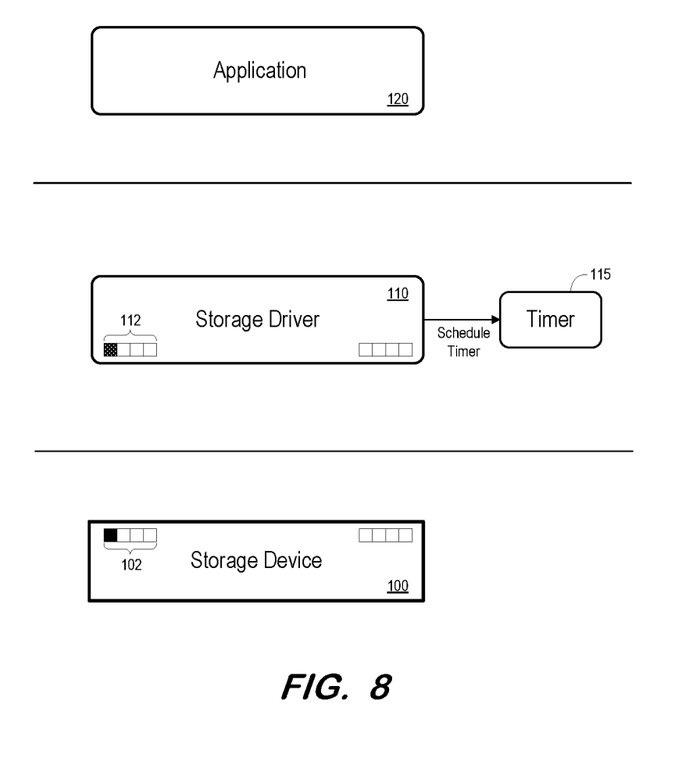
FIG. 8 illustrates scheduling of a timer according to some embodiments.

Next, at S530, storage driver 110 also sends a request to schedule timer 115 with an associated callback routine, as shown in FIG. 8. The callback routine is executable to determine whether the requested I/O operation has been completed. To assist this operation, the request may indicate the submission queue 112 to which the I/O request was written. As described with respect to FIGS. 2 and 4, the request may be sent by a processor via an in-band interrupt which returns directly to the requesting processor.

Process 500 idles after the timer is scheduled at S530 and before the timer expires. The timer expiration is detected at S540, for example via a timer interrupt sent to the requesting processor. This detection invokes the associated callback routine, wherein control is returned to storage driver 110 to determine whether the I/O operation is complete at S550.

Figure 9:
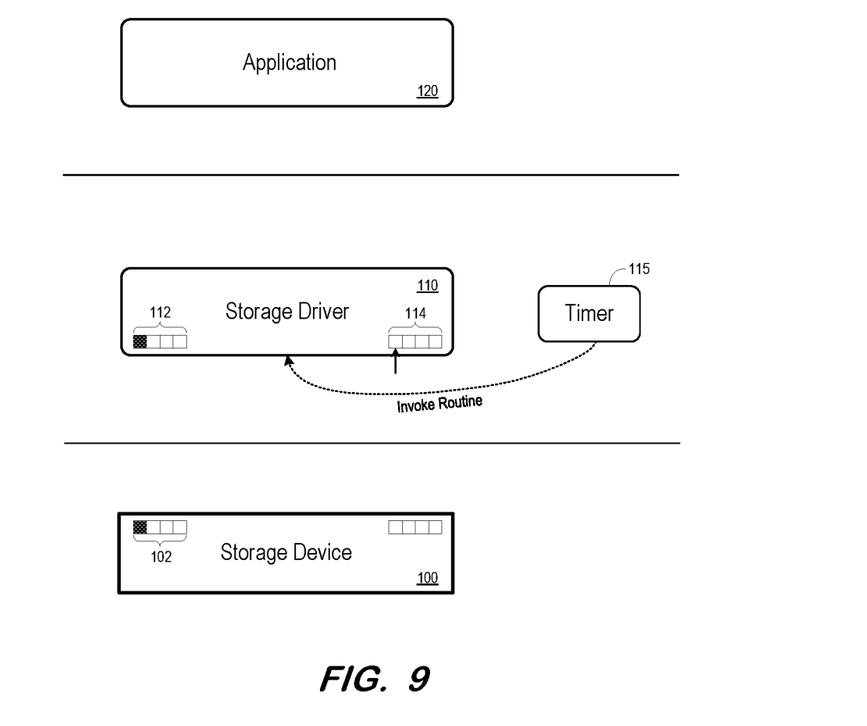
FIG. 9 illustrates invocation of a timer callback routine to determine I/O request completion according to some embodiments.

FIG. 9 illustrates S550 according to some embodiments. In response to firing of timer 115 storage driver 110 checks a completion queue 114 (indicated by an arrow) which is associated with the original submission queue 112. If the checked completion queue 114 does not indicate that the requested I/O operation is complete, flow returns to S530 to schedule the same timer as described above.

In some embodiments, the timer interval is set to 5 µs. Performance may be optimized by configuring this interval such that the callback routine executes as soon as possible after storage device 100 completes the I/O operation. If the time interval is too short, performance may suffer because the completion queue will be checked before the I/O operation is completed and the checking will not be performed again until expiration of a next-scheduled timer. If the time interval is too long, latency is longer than required. According to some embodiments, storage device 100 is profiled at system startup using test I/O operations in order to align the timer interval to the actual I/O processing time of storage device 100. In some embodiments, the timer interval value may be changed by a system administrator in view of a specific performance or latency goal.

Figure 10:
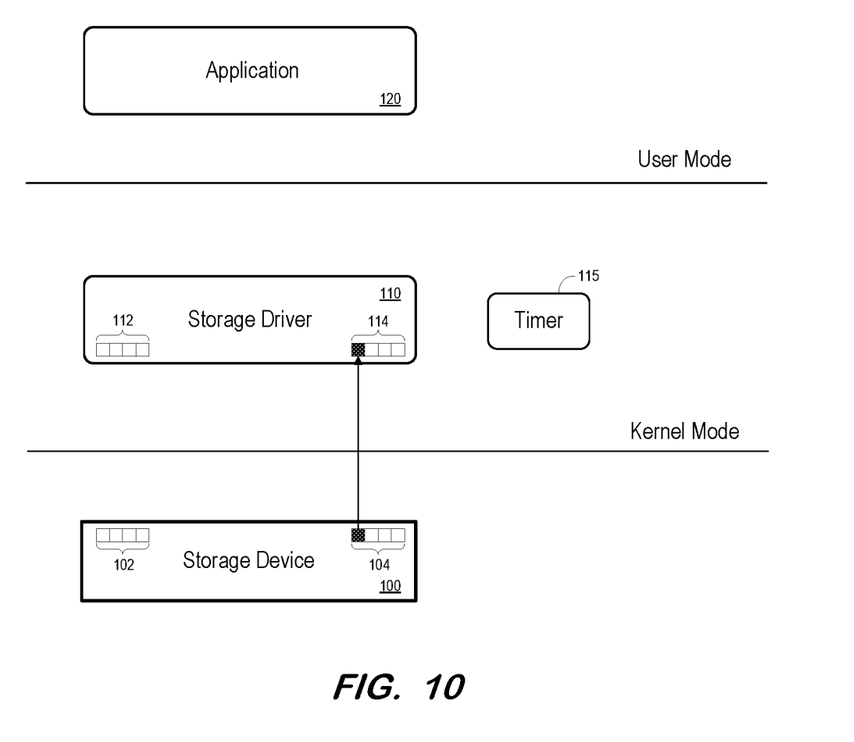
FIG. 10 illustrates completion of an I/O operation according to some embodiments.

FIG. 10 illustrates I/O completion according to some embodiments. In response to completing the I/O request, storage device 100 writes to a corresponding completion queue 104. Storage device 100 also writes an entry into the corresponding completion queue 114 indicating to the operating system that the I/O request is completed.

Figure 11:
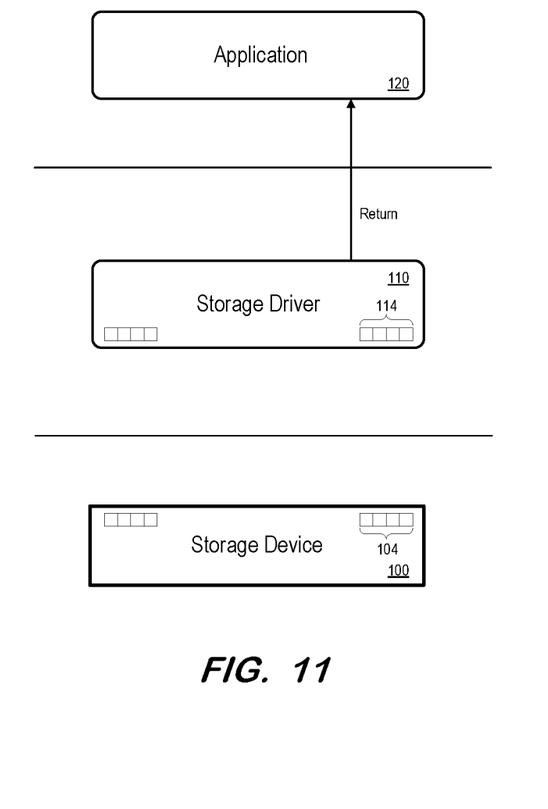
FIG. 11 illustrates completion of an I/O request according to some embodiments.

Returning to process 500, it is assumed that flow idles again after S530 until timer expiration is detected at S540. At this point, due to the entry in completion queue 114, it is determined that the requested I/O operation is complete. Accordingly, the I/O request is then completed to the requesting application at S560 as illustrated in FIG. 11. The manner in which the request is completed to the requesting application (i.e., what is "returned") may be based on entries written to completion queue 114 as is known in the art.

Flow then proceeds to S570, at which it is determined whether the current submission queue is empty. If the submission queue is not empty (i.e., one or more other I/O requests associated with the same CPU are pending), flow returns to S530 to schedule another timer associated with the current submission queue. In such an embodiment, process 500 terminates only in a case that no I/O requests are pending in the submission queue. Accordingly, only one timer need be scheduled per completion queue. Therefore, if an I/O request is received at a submission queue, and a timer is already scheduled with respect to the completion queue corresponding to the submission queue, no timer is scheduled at S530.

Although S520 and S530 are described and illustrated as being executed sequentially, these steps may be performed in reverse order or in parallel to any degree.

Figure 12:
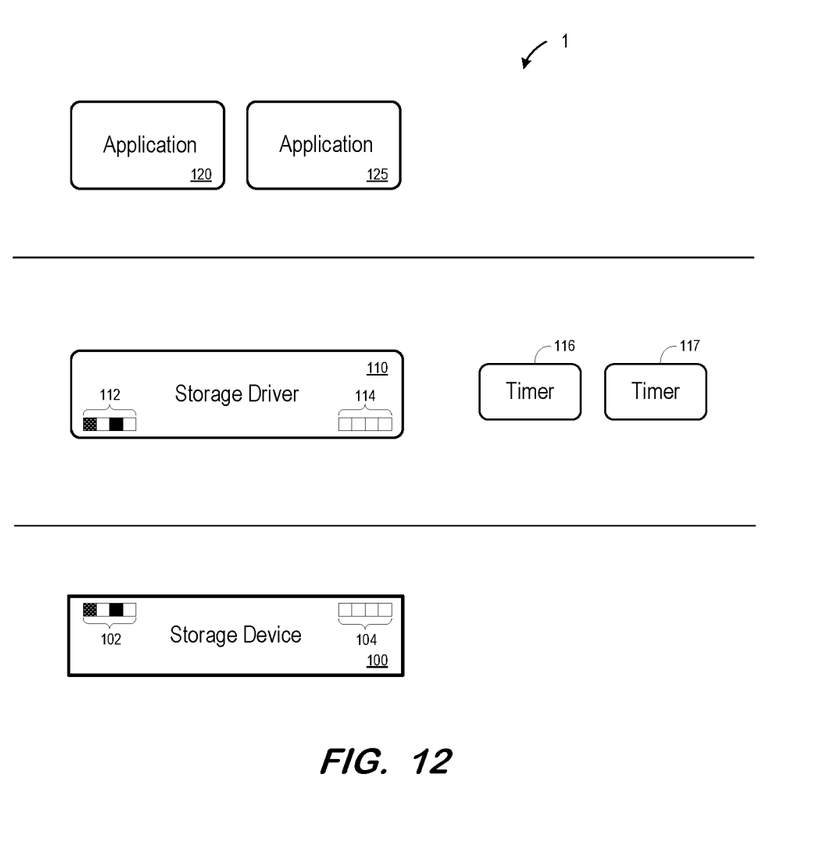
FIG. 12 illustrates a system including I/O requests received from two applications and including two scheduled timers according to some embodiments.

System 1 of FIG. 12 illustrates parallel execution of process 500 for respective individual submission queues 112. It is assumed that applications 120 and 125 have each issued I/O requests associated with storage driver 110. Each of applications 120 and 125 are executing on a different CPU, therefore the issued requests are stored in different submission queues 112 and programmed into different corresponding submission queues 102. Timer 116 has been scheduled in response to one of submission queues 112 including a pending entry, and timer 117 has been scheduled in response to the other one of submission queues 112 including a pending entry. Accordingly, in response to execution of timer 116, a completion queue 114 corresponding to timer 116 will be checked and, in response to execution of timer 117, a different completion queue 114 corresponding to timer 117 will be checked.

Figure 13:
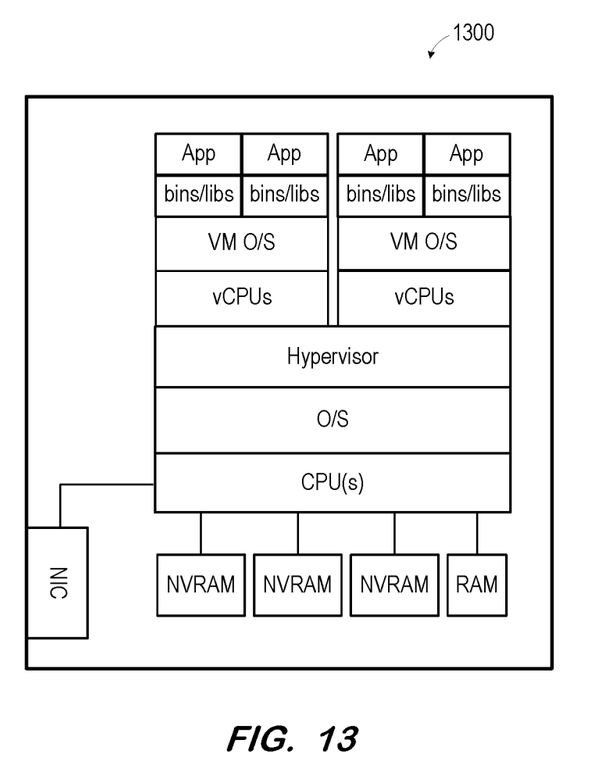
FIG. 13 illustrates a computing device hosting multiple virtual machines according to some embodiments.

FIG. 13 illustrates computing device 1300 which may implement process 500 according to some embodiments. Computing device 1300 may be a traditional standalone computing device or a blade server, for example. Computing device 1300 includes a NIC that manages communication with an external physical network. One or more CPUs execute a host operating system that supports a hypervisor layer, on which are executed two virtual machines.

Each virtual machine may be configured to utilize a dedicated amount of RAM, persistent storage (e.g., low-latency storage such as NVRAM), and processing resources (such as a physical timer) of computing device 1300. Each virtual machine may execute its own operating system which may be the same or different than the operating system executed by the other virtual machine. Each virtual machine may run one or more applications on its operating system to request I/O operations from NVRAM. These I/O requests may be processed as described above. By doing so, some embodiments provide improved latency and throughput over conventional processing in which an interrupt generated by the storage device would be delivered to a physical CPU, to the Hypervisor layer, and then to a virtual CPU of the requesting application.

Figure 14:
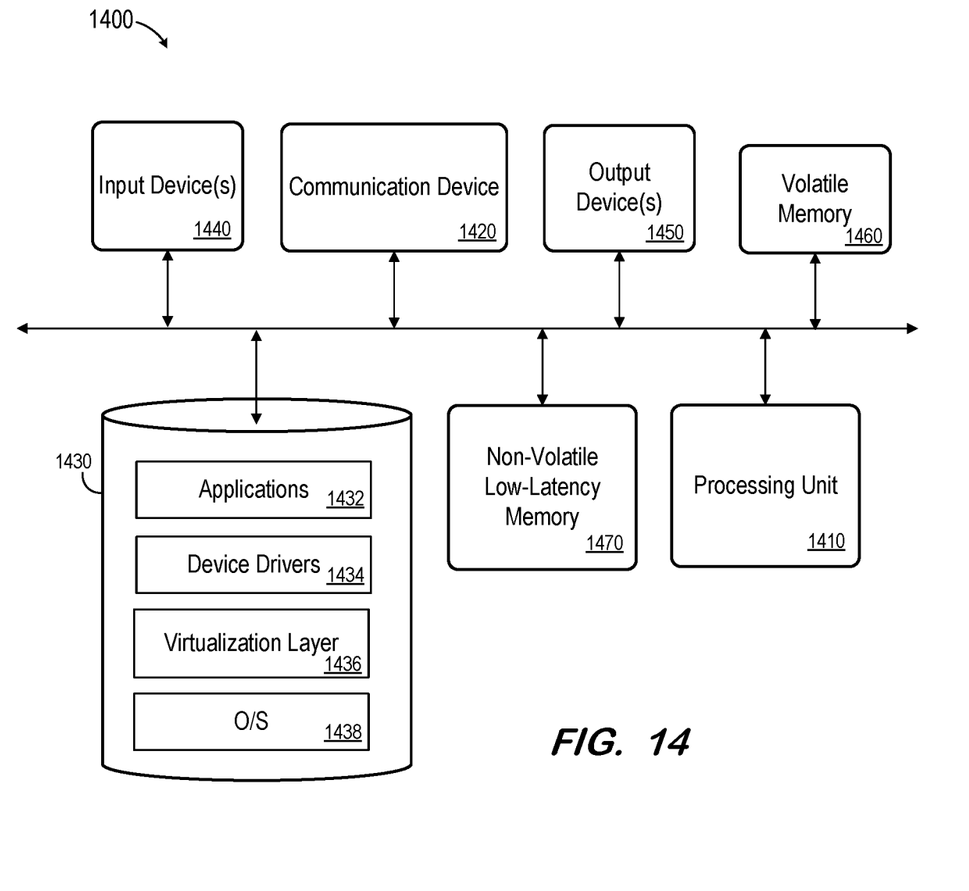
FIG. 14 illustrates a computing system according to some embodiments.

FIG. 14 is a block diagram of system 1400 according to some embodiments. System 1400 may comprise a general-purpose computer server and may execute program code to provide I/O request processing using any of the processes described herein. Any one or more components of system 1400 may be implemented in a distributed architecture. System 1400 may include other unshown elements according to some embodiments.

System 1400 includes processing unit 1410 operatively coupled to communication device 1420, persistent data storage system 1430, one or more input devices 1440, one or more output devices 1450, volatile memory 1460 and low-latency non-volatile memory 1470. Processing unit 1410 may comprise one or more processors, processing cores, processing threads, etc. for executing program code. Communication device 1420 may facilitate communication with external devices, such as client devices requiring application services. Input device(s) 1440 may comprise, for example, a keyboard, a keypad, a mouse or other pointing device, a microphone, a touch screen, and/or an eye-tracking device. Output device(s) 1450 may comprise, for example, a display (e.g., a display screen), a speaker, and/or a printer. Input device(s) 1440 and/or output device(s) 1450 may be coupled to system 1400 as needed and in some cases no such devices are coupled to system 1400 during operation.

Data storage system 1430 may comprise any number of appropriate persistent storage devices, including combinations of magnetic storage devices (e.g., magnetic tape, hard disk drives and flash memory), optical storage devices, Read Only Memory (ROM) devices, etc. Memory 1460 may comprise Random Access Memory (RAM) of any type that is or becomes known. Non-volatile low-latency memory 1470 may comprise Non-Volatile Random Access Memory (NVRAM), Storage Class Memory (SCM) or any other low-latency memory that is or becomes known.

Applications 1432 may comprise program code executed by processing unit 1410 to cause system 1400 to provide functionality and may require I/O services in order to provide such functionality. For example, program code of applications 1432 may be executed to transmit a request for an I/O operation to executing operating system 1436, which provides the request to one of executing device drivers 1434. If the request is associated with non-volatile low-latency memory 1470, the request is received by the one of device drivers 1434 which is associated with memory 1470. Processing may therefore continue as described above to complete the I/O request.

Applications 1432 and device drivers 1434 may execute natively on operating system 1438 and/or in a virtualized environment provided by virtualization layer 1436. Data storage device 1430 may also store data and other program code for providing additional functionality and/or which are necessary for operation of system 1400.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computing system comprising:
   one or more processors executing processor-executable program code; and
   a storage device,
   wherein the system is operable to:
   receive a request from an application to perform an I/O operation at the storage device;
   in response to reception of the request:
   provide the request to the storage device; and
   schedule a timer associated with a callback routine to determine whether the storage device has completed the I/O operation;
   in response to expiration of the scheduled timer, determine whether the storage device has completed the I/O operation; and
   if it is determined that the storage device has completed the I/O operation, complete the request to the application.

2. A computing system according to claim 1, wherein scheduling of the timer comprises:
   transmission of a scheduling request to the timer from a first one of the one or more processors, the scheduling request comprising an identifier associated with the first one of the one or more processors, the system further operable to:
   transmit a timer interrupt from the timer to the first one of the one or more processors;
   detect, at the first one of the one or more processors, the expiration of the scheduled timer based on the timer interrupt.

3. A computing system according to claim 2, wherein the timer is based on a synthetic timer source of a virtualization layer, and wherein the synthetic timer source is based on a physical timer source of the computing system.

4. A computing system according to claim 2, the system further operable to:
   receive a second request to perform a second I/O operation;
   in response to reception of the second request:
   provide the second request to the storage device; and
   schedule a second timer associated with a second callback routine to determine whether the storage device has completed the second I/O operation;
   in response to expiration of the scheduled second timer, determine whether the storage device has completed the second I/O operation; and
   if it is determined that the storage device has completed the second I/O operation, complete the second request to the application,
   wherein scheduling of the second timer comprises:
   transmission of a second scheduling request to the second timer from a second one of the one or more processors, the second scheduling request comprising a second identifier associated with the second one of the one or more processors, the system further operable to:
   transmit a second timer interrupt from the timer to the second one of the one or more processors;
   detect, at the second one of the one or more processors, the expiration of the second scheduled timer based on the second timer interrupt.

5. A computing system according to claim 4, wherein determination of whether the storage device has completed the I/O operation comprises checking a first completion queue, and
   wherein determination of whether the storage device has completed the second I/O operation comprises checking a second completion queue.

6. A computing system according to claim 1, wherein the timer supports a five microsecond timer interval and is based on a synthetic timer source of a virtualization layer, and wherein the synthetic timer source is based on a physical timer source of the computing system.

7. A computing system according to claim 1, the system further operable to:
receive a second request to perform a second I/O operation;
in response to reception of the second request: provide the second request to a second submission queue of the storage device; and
schedule a second timer associated with a second callback routine to determine whether the storage device has completed the second I/O operation; and
in response to expiration of the scheduled second timer, determine whether the storage device has completed the second I/O operation; and
if it is determined that the storage device has completed the second I/O operation, complete the second request to the application,
wherein the request and the second request are provided to a first submission queue of the storage device.

8. A computing system comprising a storage device and executing an operating system, an application, and a storage driver, the computing system to:
transmit a request to perform an I/O operation at the storage device from the application to the storage driver;
in response to reception of the request, transmit the request from the storage driver to the storage device; and
schedule, by the storage driver, a timer associated with a callback routine to determine whether the storage device has completed the I/O operation;
detect expiration of the scheduled timer;
in response to expiration of the scheduled timer, determine whether the storage device has completed the I/O operation; and
if it is determined that the storage device has completed the I/O operation, complete the request to the application.

9. A computing system according to claim 8, wherein scheduling of the timer comprises:
transmission of a scheduling request to the timer from a first one of one or more processors of the computing system, the scheduling request comprising an identifier associated with the first one of the one or more processors, wherein detection of the expiration comprises:
transmission of a timer interrupt from the timer to the first one of the one or more processors;
detection, at the first one of the one or more processors, of the expiration of the scheduled timer based on the timer interrupt.

10. A computing system according to claim 9, wherein the timer is based on a synthetic timer source of a virtualization layer executing on the computing system, and wherein the synthetic timer source is based on a physical timer source of the computing system.

11. A computing system according to claim 9, the system further operable to:
receive a second request from a second application to perform a second I/O operation;
in response to reception of the second request:
transmit the second request from the storage driver to the storage device; and
schedule, by the storage driver, a second timer associated with a second callback routine to determine whether the storage device has completed the second I/O operation;
detect expiration of the second timer;
in response to expiration of the scheduled second timer, determine whether the storage device has completed the second I/O operation; and
if it is determined that the storage device has completed the second I/O operation, complete the second request to the application,
wherein scheduling of the second timer comprises:
transmission of a second scheduling request to the second timer from a second one of the one or more processors, the second scheduling request comprising a second identifier associated with the second one of the one or more processors, wherein detection of the expiration of the second timer comprises:
transmission of a second timer interrupt from the timer to the second one of the one or more processors;
detection, at the second one of the one or more processors, of the expiration of the second scheduled timer based on the second timer interrupt.

12. A computing system according to claim 11, wherein determination of whether the storage device has completed the I/O operation comprises checking a first completion queue, and
wherein determination of whether the storage device has completed the second I/O operation comprises checking a second completion queue.

13. A computing system according to claim 8, wherein the timer supports a five microsecond timer interval and is based on a synthetic timer source of a virtualization layer executing on the computing system, and wherein the synthetic timer source is based on a physical timer source of the computing system.

14. A computing system according to claim 8, the system further operable to:
receive a second request from a second application to perform a second I/O operation;
in response to reception of the second request:
transmit the second request from the storage driver to a second submission queue of the storage device; and
schedule, by the storage driver, a second timer associated with a second callback routine to determine whether the storage device has completed the second I/O operation;
detect expiration of the second timer; and
in response to expiration of the scheduled second timer, determine whether the storage device has completed the second I/O operation; and
if it is determined that the storage device has completed the second I/O operation, complete the second request to the application,
wherein the request and the second request are provided to a first submission queue of the storage device.

15. A computer-implemented method comprising:
receiving a request to perform an I/O operation at a storage driver;
in response to receiving the request:
providing the request to a storage device; and
scheduling a timer associated with a callback routine to determine whether the storage device has completed the I/O operation;
in response to expiration of the scheduled timer, determining whether the storage device has completed the I/O operation; and if it is determined that the storage device has completed the I/O operation, complete the request to the application.

16. A computer-implemented method according to claim 15, wherein scheduling of the timer comprises:
transmitting a scheduling request to the timer from a first processor, the scheduling request comprising an identifier associated with the first processor, the method further comprising:
transmitting a timer interrupt from the timer to the first processor;
detecting, at the first processor, the expiration of the scheduled timer based on the timer interrupt.

17. A computer-implemented method according to claim 16, wherein the timer is based on a synthetic timer source of a virtualization layer, and wherein the synthetic timer source is based on a physical timer source.

18. A computer-implemented method according to claim 16, the method further comprising:
receiving a second request to perform a second I/O operation at the storage driver;
in response to reception of the second request:
providing the second request to the storage device; and
scheduling a second timer associated with a second callback routine to determine whether the storage device has completed the second I/O operation; and
in response to expiration of the scheduled second timer, determining whether the storage device has completed the second I/O operation; and
if it is determined that the storage device has completed the second I/O operation, complete the second request to the application,
wherein scheduling of the second timer comprises:
transmitting a second scheduling request to the second timer from a second processor, the second scheduling request comprising a second identifier associated with the second processor, the method further comprising:
transmitting a second timer interrupt from the timer to the second processor;
detecting, at the second processor, the expiration of the second scheduled timer based on the second timer interrupt.

19. A computer-implemented method according to claim 18, wherein determining whether the storage device has completed the I/O operation comprises checking a first completion queue, and
wherein determination of whether the storage device has completed the second I/O operation comprises checking a second completion queue.

20. A computer-implemented method according to claim 15, wherein the timer supports a five microsecond timer interval and is based on a synthetic timer source of a virtualization layer, and wherein the synthetic timer source is based on a physical timer source.

* * * * *